United States Patent [19]

Higginbotham

[11] 4,026,689
[45] May 31, 1977

[54] APPARATUS FOR MAKING GLASS FIBERS

[75] Inventor: James M. Higginbotham, Newark, Ohio

[73] Assignee: Owens-Corning Fiberglas Corporation, Toledo, Ohio

[22] Filed: Oct. 1, 1975

[21] Appl. No.: 618,715

[52] U.S. Cl. ............................ 65/1; 13/6; 65/135; 65/347; 65/DIG. 7; 219/10.81
[51] Int. Cl.² ............................ C03B 37/02
[58] Field of Search ............ 65/1, 2, 12, 135, 347, 65/DIG. 4; 13/6, 25; 219/10.81

[56] References Cited
UNITED STATES PATENTS 3,512,948  5/1970  Glaser et al. .................. 13/6 X Primary Examiner—Robert L. Lindsay, Jr.
Attorney, Agent, or Firm—John W. Overman; Charles R. Schaub; Ronald C. Hudgens

[57] ABSTRACT

A feeder for delivering streams of molten mineral material for attenuation into filaments having an electrically conductive bottom wall with orifices formed therein. The molten material in the feeder passes through the orifices and is delivered as streams for attenuation into fibers. Extending from the bottom wall, in a direction generally normal to the plane of the bottom wall, are electrically conductive side and end walls. Positioned within the feeder generally parallel to the plane of the bottom wall is a molten material conditioning means. On the exterior surface of each of the end walls there is a terminal for conducting electrical energy to the feeder to heat the walls and molten material conditioning means of the feeder and thereby condition the molten material in the feeder. Each of the terminals has an inner portion attached to the end walls at the location of the molten material conditioning means. The inner member is positioned so that it is generally parallel to the plane of the bottom wall. Each of the terminals also has an outer portion, that is attached to the inner portion, in spaced apart relationship from the end walls. And the outer portion extends from the inner portion towards the bottom wall in a direction generally normal to the plane of the inner member.

14 Claims, 4 Drawing Figures

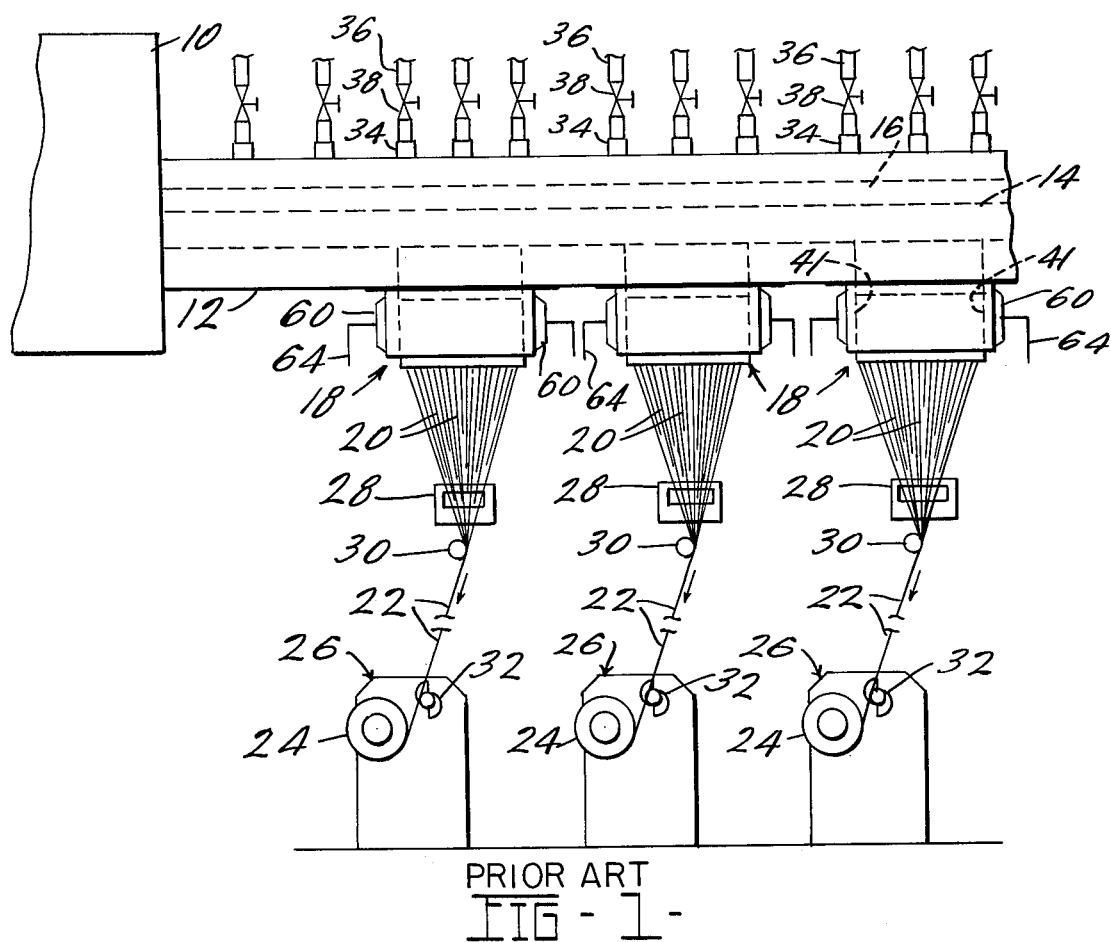
PRIOR ART
FIG-1-
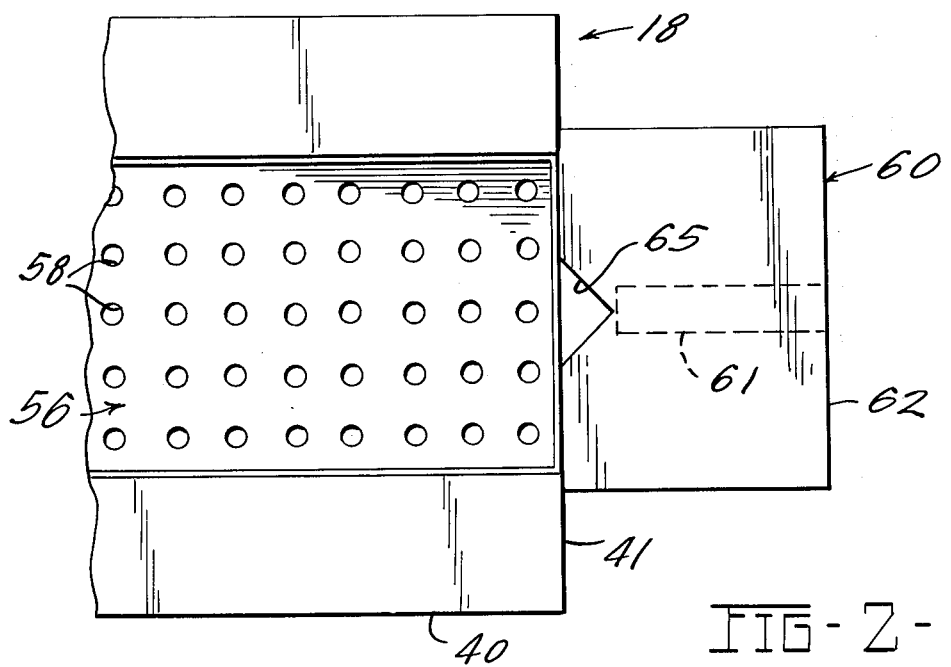
FIG-2-

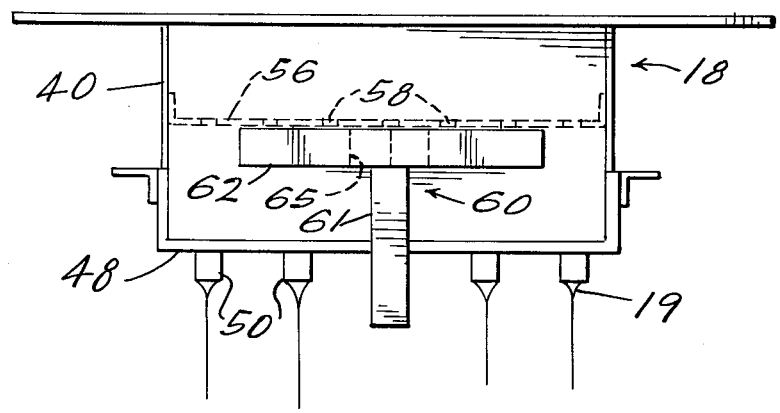
FIG-3-
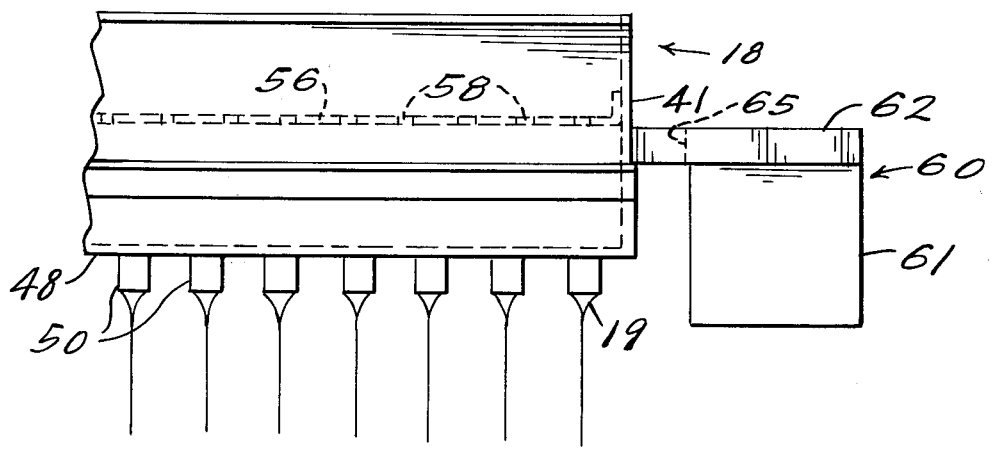
FIG-4-

APPARATUS FOR MAKING GLASS FIBERS

BACKGROUND OF THE INVENTION

Recent developments have been made wherein glass batch is reduced to a molten state and refined in a furnace and the molten glass flows through forehearth channel to stream feeders or bushings disposed along the forehearth and the streams of the glass delivered through orifices in the feeders or bushings and attenuated into filaments by winding a strand of the filaments upon a rotating collector. This latter process is referred to as a direct melt process in the melting and refining of the glass by the application of heat, the temperature of the molten glass is brought to a temperature that is comparatively high in order to effect refining of the glass. During this process of melting and refining of glass, gases and volatiles are emitted or driven off from the melt. This action of melting and refining the glass at elevated temperatures renders the glass substantially stable for any temperature less than the minimum melt temperature in the furnace. Heretofore in the direct melt process, the temperatures of the glass in the forehearth channel and the stream feeders or bushings are substantially lower than the temperature of the melt in the furnace. Thermal, physical and chemical inhomogeneities tend to occur in the transport of the glass in the forehearth channels through heat losses at the refractory sides and contact with the sides tending to contaminate the glass with refractory cords. Frequent filament breakouts, formation of nonuniform filaments and other difficulties have been encountered which are believed attributable at least in part to such inhomogeneities in bushings or stream feeders disposed along the forehearth and supplied with glass from the forehearth channel. In stream feeders or bushings conventionally used along a forehearth channel, temperature upsets and inhomogeneities of the glass cannot adequately be correct or abated in a comparatively short time that the glass is resident in the feeder or bushing. To overcome this problem a comparatively deeper bushing or feeder has been used and the glass in the feeder or bushing has been reheated to a temperature approaching but not exceeding the maximum original melt temperature to recondition the glass.

However, the deeper feeders are an expensive answer to the problem. The additional platinum and rhodium alloy required to construct the deeper feeder greatly increases the cost of the feeder. In addition the electrical terminals, that supply electrical energy to the feeder to condition the molten glass, must be larger to properly distribute the energy to the feeder. To construct these larger terminals it is usually necessary to weld a number of pieces together to form the larger terminals. As a result of the need for larger terminals more expensive platinum and rhodium alloy must be used in the terminals. This, of course increases the cost penalty of using a deeper feeder.

Therefore, it is important that an improved electrical terminal be constructed so that relatively shallow feeders can be used to form fibers from molten material. The terminal must be of a design so that the molten material will be given an effective terminal treatment in the short time that the molten material is in the shallow feeder. This type of terminal will greatly reduce the amount of expensive materials used to construct the feeder and will, therefore, improve the cost efficiency of direct melt fiber forming processes.

SUMMARY OF THE INVENTION

An object of the invention is an improved feeder for forming fibers from a molten material.

Another object of the invention is an improved electrical terminal for supplying electrical energy to a feeder.

Yet another object of the invention is an electrical terminal on a feeder that reduces the amount of metal necessary to fabricate the feeder.

An additional object of the invention is to reduce the amount of material needed to construct an electrical terminal for a feeder.

Still another object of the invention is an improved electrical terminal that distributes electrical energy in a manner so that molten material will be properly conditioned in a shallow feeder.

Another object of the invention is an improved feeder and electrical terminal that reduces the amount of electrical energy necessary to condition molten material in the feeder.

In a broad sense these and other objects of the invention are attained by a feeder having an electrically conductive bottom wall having orifices formed therein through which the molten material is attenuated into fibers. Connected to the bottom wall are electrically conductive side and end walls that extend generally normal from the plane of the bottom wall. Disposed within the feeder is a molten material conditioning means that is located generally parallel to the plane of the bottom wall. On the exterior surface of each of the end walls there is a terminal for conducting electrical energy to the feeder. The electrical energy heats the walls and molten material conditioning means of the feeder to condition the molten material in the feeder. Each of the terminals have an inner portion attached to the end walls at the location of the molten material conditioning means and the inner portion is positioned generally parallel to the plane of the bottom wall. Each of the terminals also have an outer portion in spaced apart relationship from the end walls and the outer portion is attached to the inner portion. The outer portion also extends from the inner portion towards the bottom wall in a direction generally normal to the plane of the inner member.

Other objects and advantages of the invention will become apparent as the invention is described hereinafter in more detail with reference made to the accompanying drawings.

DESCRIPTION OF THE DRAWINGS

FIG. 1 is a semi-schematic elevational view of a forehearth and feeder arrangement for use with the teachings of this invention.

FIG. 2 is a top view of the embodiment of this invention.

FIG. 3 is an end elevation view of the embodiment of this invention.

FIG. 4 is a side elevation view of the embodiment of this invention.

DESCRIPTION OF THE PREFERRED EMBODIMENTS

While the method and apparatus of the invention have particular utility in the processing of mineral fibers, such as glass, for forming fibers or filaments from streams of glass, it is to be understood that the method and apparatus of this invention may be employed wherever it may be found to have utility.

Referring to the drawings in detail, FIG. 1 is a semischematic elevational view illustrating a forehearth construction of a direct melt system for supplying heat-softened glass to a plurality of stream feeders or bushings associated with the forehearth. The glass batch is introduced into a melting and refining furnace or tank 10 at an end region of the furnace opposite the forehearth 12 which is connected with the melting and refining furnace.

The glass batch is reduced to a flowable or molten condition in the furnace 10 and the molten glass is traversed to the furnace 10 to effect a refining of the glass whereby refined glass 14 is delivered from the furnace into the forehearth channel 16 lengthwise of the forehearth. The glass is processed to render it suitable for attenuation into filaments or fibers. Spaced lengthwise along the forehearth 12 are stream feeders or bushings 18.

The floor tip section of each feeder or bushing is provided with orifice means through which flow streams of glass attenuated into filaments 20 by winding a strand 22 of the filaments upon a rotating collector 24 of the winding machine 26 of conventional construction, there being a winding apparatus for the filaments derived from each feeder.

The streams may be attenuated into fibers or filaments by other attenuating methods. An applicator 28 may be provided for each group of filaments for delivering binder or coating material onto each group of filaments. The filaments of each group are converged into a strand by gathering shoe 30. During winding of the strand on a collector 24 a rotatable and reciprocable traverse means 32 engages the strand for distributing the strand lengthwise on a collector 24 to form a package. During winding the rotation of the traverse 32 oscillates the strand 22 to cause the individual wraps or convolutions of strand to be collected on the collector in crossing relation in a conventional manner.

The glass in the forehearth is maintained in a flowable condition by applying heat by means of burners 34 disposed in the roof of the forehearth 12, the burners being supplied with fuel gas and air mixture through tubular means 36 connected with a mixture supply, a valve means 38 being associated with each burner construction for regulating the delivery of fuel and air mixture to the burner. The burners are preferably of the radiant type but may be of any suitable character for establishing heat in the forehearth channel 16 to control the temperature of the glass 14 in the forehearth channel.

Illustrated in FIGS. 2, 3 and 4 is an embodiment of the new bushing or feeder that is the subject matter of this invention. Each bushing or feeder 18 is inclusive of a bottom wall 48 having orificed tip means 50 formed therein, side walls 40 and end walls 41. The feeder is preferably fashioned of an alloy of platinum and rhodium or other suitable metallic material capable of withstanding the high temperature of molten glass and of corrosion resistent character. The depending projections or tips 50 are generally tubular and provide an orifice through which flows a stream 19 of glass or other molten mineral material. The feeder 18 should have sufficient capacity so that the molten glass or mineral material may be given a thermal treatment after entry from the forehearth channel before the molten material reaches the lower or bottom wall 48.

The feeder 18 shown in these figures is a shallow feeder with a height of approximately 1-½-2 inches. This size feeder has sufficient capacity that the molten material can be given a thermal treatment but the thermal treatment must be given to the molten material quickly and efficiently because the molten material does not remain in this type of shallow feeder very long. Therefore, it is important that an efficient system be used to give the molten material its thermal treatment.

In the upper portion of the feeder 18 there is a molten material conditioning means 56 for heating the glass in the feeder to further condition it. The heater member 56 is preferably in the form of a screen or strip having perforations 58 to accommodate glass flow therethrough. In addition to heating and conditioning the glass the heater screen also removes undesirable nonuniformities therein that have come in with the glass from the forehearth. The heater screen is securely attached to the inside of the walls of the feeder and this is usually accomplished by welding the heater screen 56 to the walls.

The electrical terminal means indicated generally at 60 in FIGS. 2, 3 and 4 has an inner portion or member adjacent to and electrically connected to end wall 41 for supplying electrical energy to the walls of the feeder. The electrical terminal is preferably fashioned from an alloy of platinum and rhodium or other suitable metallic material of withstanding the high temperatures of molten glass and of corrosion resistent character. The inner member 62 of the terminal is connected to the end walls 41 so that the inner member 62 is parallel to the plane of the bottom wall 48. In practice this usually means that the inner member 62 is in a horizontal position as the bottom wall 48 on the feeder 18 is usually in a horizontal position. The inner member is usually attached to the end wall 41 by having the inner member welded directly to the end wall. This type of attachment method provides a very good electrical connection between the inner member and the end wall and also firmly secures the inner member to the end wall. Of course other suitable electrically conductive means could be used to secure the inner member to the end wall.

Secured to the inner member 62 is an outer member 61 that is also electrically conductive. The outer member 61 is usually secured to the inner member by welding as this forms a secure and electrically conductive joint between the inner and outer members. Of course any other suitable electrically conductive attachment means could be used to attach the outer member to the inner member. The outer member 61 is attached to the inner member 62 so that the outer member is normal to the plane of the inner member. Also the outer member is positioned so that it extends from the inner member in a direction towards the bottom wall 48 of the feeder 18. In practice this usually means that the outer member is a vertical member that extends downward from the lower surface of the inner member towards the bottom wall of the feeder.

A source of electrical energy can then be attached to the outer member 61 so that the electrical energy will flow through the outer member 61 to the inner member 62. The inner member then transfers the electrical energy to the walls of the feeder and to the heater screen 65 located in the feeder. The electrical energy from the inner member heats the walls and heater screen so that the molten glass or mineral material in the feeder is heated or conditioned so that more uniform and continuous fibers are formed from the molten material. The inner member 62 acts to distribute the electrical energy to the walls of the feeder and heater screen and this must be controlled carefully so that the proper amount of conditioning is supplied to the molten glass in various locations in the feeder. The goal in heating or conditioning the molten glass is to raise the temperature of molten glass, delivered from the forehearth to the feeder, back close to the temperature the material was originally melted at. This temperature increase is necessary because the molten glass cools to some degree as the material passes from the melting tank to the forehearth and then to the feeder. The decrease in the temperature in the molten glass tends to create changes in the thermal, physical and chemical homogeneities in the molten glass. This of course creates problems in forming the molten glass into uniform fibers. Therefore, it is desirable to have the temperature of the molten glass increased in the feeder so that better fibers can be formed. To accomplish this objective the molten glass should be heated so that it is at a temperature close to its original melting temperature so that high quality uniform fibers can be formed. The temperature of the molten glass in the feeder should, however, never be raised to the original melting temperature or higher. This is because at this elevated temperature glass and volatiles are driven from the molten glass and these disturbances can severely impair the quality of fibers produced. Therefore, the molten glass should be heated so that it is a temperature just below its original melting temperature so that uniform fibers can be formed.

To condition the molten glass it is only necessary that the molten glass be at this elevated temperature just before it is formed into filaments. Therefore, the heating of the molten glass will be concentrated in the region of the feeder where the molten material is formed into fibers. Therefore, the inner member 62 is positioned on the end walls 41 so that a major portion of the electrical energy will be directed to the heater screen, the loweer portion of the walls and the bottom wall of the feeder that are in the region where the fibers are formed. This helps to establish the proper temperature in the molten glass just prior to the glass being formed into fibers. In addition the inner member 62 can be positioned so that it extends almost across or entirely across the end wall 48 of the feeder 18 so electrical energy is supplied uniformly to the end wall so that the walls of the feeder will be more uniformly heated. Further, the inner member 62 has usually been positioned in the general location of the heater screen 56. This helps to transfer the electrical energy to the heater screen so that it will be more effective in conditioning or heating the molten glass. In practice it has been found that if the heater screen 56 is in the same plane as or at the upper edge of the inner member 62 that a very good transfer of electrical energy to the heater screen can be accomplished.

To further improve the ability of the feeder to condition the molten glass the lower portion of the side and end walls and the bottom wall can be made of thicker material (as shown in FIG. 3). Usually the side and end walls become thicker in the region where the inner member 62 is connected to the feeder and this thicker section extends down to the thicker bottom wall. The thicker sections of the side, end and bottom walls provides a lower resistance to the electrical energy supplied to the feeder. Therefore, the electrical energy will pass more easily through theese thicker sections of the feeder and a large portion of the electrical energy will thus pass through the thicker sections. Because more electrical energy is passing through the lower portion of the side and end walls and also the bottom wall. These sections of the feeder will be heated to a higher temperature. This will result in the molten glass being heated to a higher temperature in this region of the feeder that is located just before the point where the molten material is formed into fibers. Therefore, this design for the walls of the feeder will assist in conditioning the molten glass so that it is at the proper temperature when it is formed into fibers.

The use of thicker sections on the lower portions of the side and end wall and on the bottom wall also acts to reduce the amount of metal needed to construct the feeder. By concentrating the metal in the bottom of the feeder where it is most needed the rest of the feeder can be constructed of lighter material. Therefore, instead of constructing the entire feeder out of thick material only that portion of the feeder where the molten glass needs to be at its hottest temperature is constructed out of the thicker material. This obviously helps to reduce the amount of expensive platinum and rhodium needed in the feeder.

It has been found in practice that the shape and location of the inner member along with the thicker walls in the bottom of the feeder will help to reduce the electrical energy required to condition the molten glass. It is believed that this results because the inner member of the terminal directs the electrical energy to the feeder so that the molten glass is more uniformly heated. This of course makes it easier to heat the entire mass of molten glass to the required temperature. The location of the heater screen also insures that the electrical energy will pass directly into the heater screen and of course this makes heating the heater screen more efficient. Also the thicker section on the walls of the feeder divert the electrical energy to the location of the feeder where the electrical energy is most efficient in heating the molten glass to the required temperature before it is formed into fibers. The resulting effect is that molten glass in a relatively shallow bushing can be conditioned to the proper temperature while the amount of electrical energy required to do so is reduced.

An additional improvement that can be added to the inner member is a notch 65 that is located in the surface of the inner member that contacts the end wall of the feeder. The notch 65 prevents electrical energy from being transferred to the end wall in the area of the notch. Thus, the notch acts to distribute the electrical energy that is being supplied to the feeder, so that a particular distribution of electrical energy and therefore, heat can be accomplished. Although the notch could be located in almost any location along the edges of the inner member 62 it has been found in practice that the center of the surface works to best advantage. This distributes the electrical energy so that the molten glass in the area of the side walls and corners of the feeder are also heated to the proper conditioning temperature.

The shape of the inner member 62 can be almost any flat or planar surface that can be suitably connected to the end wall. However, it has been found that a trapezodial shaped inner member works particularly well. The trapezodial shape provides a wider surface of base that can be connected to the end wall 41 of the feeder 18 so that the inner member will extend substantially across the end wall. This provides a larger surface for distributing the electrical energy to the feeder so that the molten glass will be conditioned properly. Also the trapezodial shaped inner member has a narrower surface or end on the portion of the inner member that is located away from the feeder but that is parallel to the surface of the member that contacts the surface of the feeder. Therefore, there is a wider end of the inner member that contacts the feeder and a narrower end of the inner member removed from the feeder but parallel to the wider end of the trapezodial shaped inner member. This configuration supplies a good surface for contacting the end wall to provide a good distribution of electrical energy but also also since the inner member tapers down to a smaller width end the trapezodial shape also saves metal. Therefore, the trapezodial shape works very well because it provides a good surface for making electrical contact with the end wall and because it is a shape that reduces the amount of platinum and rhodium alloy required in the terminal. It should be noted that other similar shapes could be used for the inner member as long as they provided a good surface for contacting the end wall of the feeder.

The outer member of the terminal 61 is spaced apart from the end wall 41 of the feeder 18 because the outer member is not used to directly supply electrical energy to the feeder. Instead the outer member is used to transfer the electrical energy to the inner member where the energy is then distributed to the feeder 18. Since the outer member does not touch the end wall of the feeder the outer member can usually be made a little smaller. In practice it has been found that the outer member works very well if it is a generally flat or planar surface having a square or rectangular shape and where the outer member extends down below the bottom wall 48 of the feeder 18. Also the outer member can extend from a point, on the inner member 62, near the end wall 41 to the outer end of the inner member. The spacing of the outer member from the end wall can vary depending on the results desired but it has been found that a spacing of approximately ½ inch works well. Also, if the inner member 62 has a notch 65 the outer member can be positioned so that it is the width of the notch away from the end wall. That is, the outer member will extend from the notch out to the outer end of the inner member.

Since the terminal 18 is constructed of only two relatively simple shapes the terminal can be constructed relatively easily. The inner and outer members are just welded together in the proper position and then the terminal is welded to the end wall of the feeder. As flat or planar pieces of material are used in the terminal difficult bends or cuts are avoided. Also the simple shape of the terminal helps to reduce the amount of metal required in the terminal. Reduction in the metal used in the terminal is a very important consideration as this greatly reduces the cost of a feeder.

Having described the invention in detail and with reference to particular materials, it will be understood that such specifications are given for the sake of explanation. Various modifications and substitutes other than those cited may be made without departing from the scope of the invention as defined by the following claims.

I claim:

1. A feeder for delivering streams of molten mineral material for attenuation into filaments comprising:

an electrically conductive bottom wall having orifices formed therein through which molten mineral material is delivered as streams for attenuation into fibers;

electrically conductive side and end walls joined to the bottom wall to form a receptacle for molten material;

molten material conditioning means disposed within the feeder, the conditioning means being substantially parallel to the plane of the bottom wall; and, an electricaly conductive terminal positioned on the exterior surface of each of the end walls, each of the terminals including an inner portion and an outer portion, the inner portion being attached to the end walls at the location of the molten material conditioning means and being substantially parallel to the plane of the bottom wall, the outer portion being in spaced apart relationship from the end walls, the upper extremity of the outer portion being in contact with the lower surface of the inner portion, the outer portion extending from the lower surface of the inner portion towards the bottom wall in a direction substantially normal to the plane of the inner portion.

2. The feeder of claim 1 wherein the molten material conditioning means is an electrically conductive screen that is electrically connected to the end walls.

3. The feeder of claim 1 wherein the inner portion of the terminal is substantially in the plane of the molten material conditioning means.

4. The feeder of claim 3 wherein the inner portion of the terminal extends substantially across the exterior surface of the end wall.

5. The feeder of claim 4 wherein the inner portion of the terminal contains a notch located substantially in the center of the surface of the inner member that contacts the end wall so that electrical energy will not be transferred to the end wall in the area of the notch and the notch will act to distribute the electrical energy supplied to the end wall.

6. The feeder of claim 1 wherein the outer portion of the terminal extends from the inner portion of the terminal past the bottom wall of the feeder.

7. A feeder for attenuating streams of molten mineral material into fibers comprising:

a horizontal bottom wall with orifices formed therein for delivering streams of molten material for attenuation into fibers;

side and end walls extending upwardly from the bottom wall to form a receptacle for molten material;

a heater screen positioned within the upper portion of the feeder, the heater screen being substantially parallel to the plane of the bottom wall; and, an electrical terminal positioned on the exterior surface of each end wall, each terminal including a horizontal inner portion and a vertical outer portion, the inner portion being adjacent to and connected to an end wall at the location of the heater screen, the vertical outer portion being in spaced apart relationship from the end wall, the upper extremity of the outer portion being in contact with the lower surface of the inner portion, the outer portion extending from the lower surface of the inner portion to a locus below the bottom wall of the feeder.

8. The feeder of claim 7 wherein the inner portion of the terminal contains a notch located in the center of the surface of the inner portion that contacts the end wall so that electrical energy will not be transferred to the end wall in the area of the notch and the notch will act to distribute the electrical energy supplied to the end wall.

9. The feeder of claim 8 wherein the inner portion is generally trapezoidal in shape.

10. The feeder of claim 9 wherein the outer portion extends along the surface of the inner portion from the notch to the end of the inner portion that is generally parallel with the surface of the inner portion where the notch is located.

11. The feeder of claim 10 wherein the outer portion extends along the surface of the inner portion in a direction that is generally normal to the plane of the end wall.

12. The feeder of claim 9 wherein the inner portion has a generally planar surface.

13. The feeder of claim 7 wherein the outer portion is a generally rectangular shaped member.

14. The feeder of claim 13 wherein the outer portion has a generally planar surface.

* * * * *